(12) United States Patent
Heidasch et al.

(10) Patent No.: US 9,779,135 B2
(45) Date of Patent: Oct. 3, 2017

(54) SEMANTIC RELATED OBJECTS

(75) Inventors: Robert Heidasch, Speyer (DE); Stefan Scheidl, Dieburg (DE); Michael Neumann, Speyer (DE); Matthias Kaiser, Walldorf (DE); Stephan Brand, Wiesloch (DE); Nico Licht, Heidelberg (DE); Klaus Reichenberger, Frankfurt (DE); Archim Heimann, Wiesloch (DE); Christoph Meinel, Heidelberg (DE); Steffen Moldaner, Riedstadt (DE)

(73) Assignees: SAP SE, Walldorf (DE); intelligent views gmbh, Darmstadt (DE)

( * ) Notice: Subject to any disclaimer, the term of this patent is extended or adjusted under 35 U.S.C. 154(b) by 506 days.

(21) Appl. No.: 13/288,730

(22) Filed: Nov. 3, 2011

(65) Prior Publication Data
US 2013/0117325 A1    May 9, 2013

(51) Int. Cl.
*G06F 17/30*    (2006.01)
(52) U.S. Cl.
CPC .... *G06F 17/3043* (2013.01); *G06F 17/30648* (2013.01); *G06F 17/30663* (2013.01); *G06F 17/30731* (2013.01); *G06F 17/30997* (2013.01)
(58) Field of Classification Search
CPC ............. G06F 17/30598; G06F 19/322; G06F 17/2785; G06F 17/30675; G06F 17/30696; G06F 17/30734; G06F 17/3043; G06F 17/30545; G06F 17/30566; G06Q 10/10; G06Q 10/06
USPC ................................. 707/780, 999.003, 771
See application file for complete search history.

(56) References Cited

U.S. PATENT DOCUMENTS

| | | | |
|---|---|---|---|
| 5,619,709 | A | 4/1997 | Caid et al. |
| 5,794,178 | A | 8/1998 | Caid et al. |
| 6,523,026 | B1 | 2/2003 | Gillis |
| 7,774,404 | B2 | 8/2010 | Heidasch |
| 8,180,754 | B1 | 5/2012 | Ershov |
| 8,204,844 | B2 | 6/2012 | Au |
| 8,335,314 | B2 | 12/2012 | Heidasch |

(Continued)

FOREIGN PATENT DOCUMENTS

WO    WO-0131479 A1    5/2001

OTHER PUBLICATIONS

"Feedforward neural network", Wikipedia®, [Online]. Retrieved from the Internet: <URL: http://en.wikipedia.org/wiki/Feedforward_neural_network>, (Accessed Jun. 27, 2012), 4 pgs.

(Continued)

*Primary Examiner* — Son T Hoang
(74) *Attorney, Agent, or Firm* — Schwegman Lundberg & Woessner, P.A.

(57) ABSTRACT

In an embodiment, a method is provided for utilizing a meta-model semantic network. In this method, a meta-model of the enterprise data is obtained. The meta-model provides semantic information regarding a definition of a business object. The meta-model is then used to generate a rule definition that maps enterprise data to a semantic object definition and a semantic relation definition. With the rule definition, embodiments may then generate a semantic object and a semantic relation from data extracted from the enterprise data. The semantic object and semantic relation are stored in the meta-model semantic network.

22 Claims, 6 Drawing Sheets

(56) References Cited

U.S. PATENT DOCUMENTS

| | | | |
|---|---|---|---|
| 8,527,451 | B2 | 9/2013 | Heidasch |
| 8,725,760 | B2 | 5/2014 | Heidasch |
| 8,731,998 | B2 | 5/2014 | Heidasch |
| 8,762,384 | B2 | 6/2014 | Heidasch |
| 8,769,502 | B2 | 7/2014 | Heidasch et al. |
| 8,798,969 | B2 | 8/2014 | Heidasch |
| 9,031,886 | B2 | 5/2015 | Heidasch et al. |
| 2005/0004905 | A1 | 1/2005 | Dresden |
| 2008/0319947 | A1* | 12/2008 | Latzina et al. .................... 707/3 |
| 2010/0125562 | A1 | 5/2010 | Nair et al. |
| 2010/0161524 | A1* | 6/2010 | Amid .................... G06N 5/022 706/12 |
| 2010/0275179 | A1* | 10/2010 | Mengusoglu ............ G06F 8/10 717/104 |
| 2011/0093449 | A1 | 4/2011 | Belenzon et al. |
| 2011/0161942 | A1* | 6/2011 | Brunswig ......... G06F 17/30404 717/143 |
| 2012/0110016 | A1* | 5/2012 | Phillips ......................... 707/780 |

OTHER PUBLICATIONS

Wikipedia page for Message, downloaded, [Online]. Retrieved from the Internet:<https://en.wikipedia.org/wiki/Message>, (Nov. 2015), 2 pgs.

Wikipedia page for Feedforward neural network, [Online]. Retrieved from the Internet:<https://en.wikipedia.org/wiki/Feedforward_neural_network>, (Nov. 2015), 4 pgs.

Wikipedia page for Artificial Neural Networks, [Online] Retrieved from the Internet:<https://web.archive.Org/web/20100420195141/http://en.wikipedia.org/wiki/Artificial_neural_network>, (May 2010), 13 pgs.

"U.S. Appl. No. 13/489,226, Advisory Action dated Jul. 29, 2015", 3 pgs.

"U.S. Appl. No. 13/489,226, Examiner Interview Summary dated Apr. 7, 2016", 6 pgs.

"U.S. Appl. No. 13/489,226, Examiner Interview Summary dated Sep. 9, 2016", 12 pgs.

"U.S. Appl. No. 13/489,226, Examiner Interview Summary dated Dec. 14, 2016", 3 pgs.

"U.S. Appl. No. 13/489,226, Examiner Interview Summary, dated Feb. 2, 2016", 3 pgs.

"U.S. Appl. No. 13/489,226, Final Office Action dated Mar. 17, 2016", 24 pgs.

"U.S. Appl. No. 13/489,226, Final Office Action dated May 4, 2017", 38 pgs.

"U.S. Appl. No. 13/489,226, Final Office Action dated May 20, 2015", 7 pgs.

"U.S. Appl. No. 13/489,226, Final Office Action dated Nov. 10, 2016", 43 pgs.

"U.S. Appl. No. 13/489,226, Non Final Office Action dated Jul. 13, 2016", 29 pgs.

"U.S. Appl. No. 13/489,226, Non Final Office Action dated Dec. 10, 2015", 22 pgs.

"U.S. Appl. No. 13/489,226, Response filed Jan. 26, 2015 to Non Final Office Action dated Sep. 4, 2014", 12 pgs.

"U.S. Appl. No. 13/489,226, Response filed Feb. 9, 2016 to Non Final Office Action dated Dec. 10, 2015", 12 pgs.

"U.S. Appl. No. 13/489,226, Response filed Apr. 14, 2016 to Final Office Action dated Mar. 17, 2016", 10 pgs.

"U.S. Appl. No. 13/489,226, Response filed Jul. 20, 2015 to Final Office Action dated May 20, 2015", 11 pgs.

"U.S. Appl. No. 13/489,226, Response filed Sep. 27, 2016 to Non Final Office Action dated Jul. 13, 2016", 13 pgs.

"U.S. Appl. No. 13/489,226, Response filed Dec. 9, 2016 to Final Office Action dated Nov. 10, 2016", 12 pgs.

"U.S. Appl. No. 13/623,596, Notice of Allowance dated Jan. 9, 2015", 6 pgs.

Caliusco, "Semantic Web Technologies and Articial Neural Networks for Intelligence Web Knowledge Source Discovery", (2010), 21 pgs.

Hongbin, Wang, et al., "Dublin Core-Based Metadata Extracting Algorithm from RDF-Based Information Elements", Knowledge Discovery and Data Mining, WKDD 2008., (2008), 114-117.

Kakar, P., et al., "Authenticating Image Metadata Elements Using Geolocation Information and Sun Direction Estimation", Multimedia and Expo (ICME), 2012 IEEE International Conference, (2012), 236-241.

Li, Wen-Syan, et al., "Semantic Integration in Heterogeneous Databases Using Neural Networks", (1994), 12 pgs.

Li, Wen-Syan, et al., "Semint: A tool for identifying attribute correspondence in heterogeneous databases using neural networks", (2000), 36 pgs.

Lopez, Vanessa, et al., "Power Aqua: A Multi-Ontology Based Questioning Answering System—v1", (2007), 14 pgs.

Lopez, Vanessa, et al., "Power Aqua: Fishing the Semantic Web", (2006), 18 pgs.

Priddy, Kevin, et al., "Artificial Neural Networks: an introduction", (2005), 10 pgs.

Ren, Nan, et al., "Management elements metadata extraction method for complex product manufacturing", Management Science and Engineering (ICMSE), 2013 International Conference, (2013), 604-608.

Ward, J, "A quantitative analysis of unqualified Dublin Core Metadata Element Set usage within data providers registered with the Open Archives Initiative", Digital Libraries, (2003), 315-317.

* cited by examiner

SEMANTIC RELATED OBJECTS

FIELD

The present disclosure relates generally to data searches. In an example embodiment, the disclosure relates to searching enterprise data.

BACKGROUND

Generally, a search engine is a program that is designed to search for information from a variety of sources of data, such as the World Wide Web and File Transfer Protocol (FTP) servers. Many of these conventional search engines are designed to conduct searches based on matching of keywords. For example, a conventional search engine searches documents for keywords, which are specified by a user, and returns a list of documents where the keywords are found.

However, conventional search engines often do not take into account the semantic meaning of the keywords found in the enterprise data, such as, for example, business objects and business documents. To clarify this discussion, a "business object," as used herein, may refer to a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of this business entity.

When searching, for example, business objects, a typical search engine may simply search the attributes associated with business objects. For example, in response to receiving a query for "employees located in San Diego," the typical search engine may return a business object of a company with a name of "San Diego Surf Shop" because the business object of the company has an attribute containing "San Diego." However, this is not what the user wants because the business record is not an employee, nor is the company even located in San Diego. As a result, many of these conventional search engines are notoriously inaccurate at searching for enterprise data containing keywords with meanings that depend on the context of the attribute.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
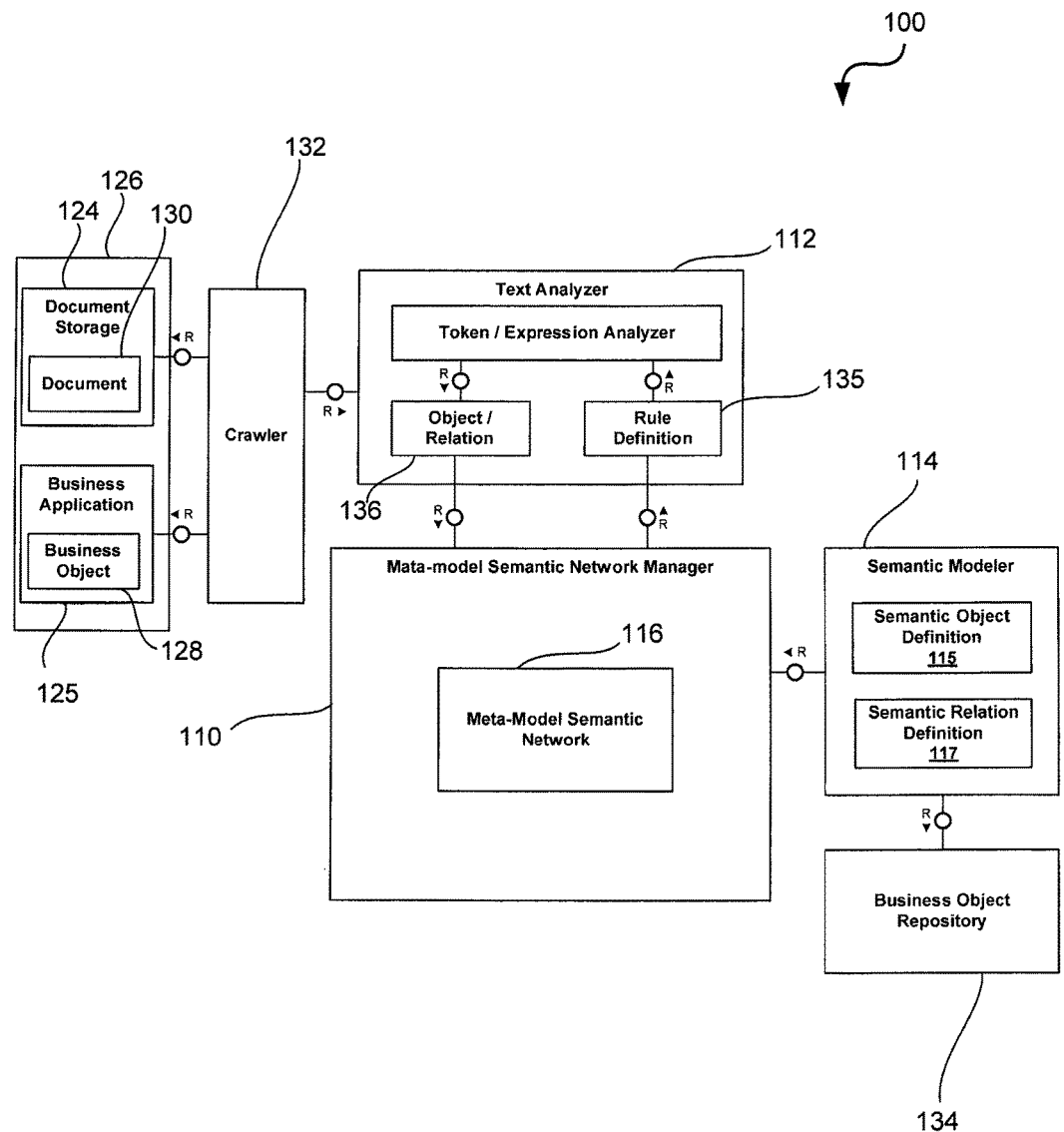
FIG. 1 is a block diagram depicting an architectural overview of a system for generating a meta-model semantic network that is usable for conducting data searches, in accordance with an example embodiment.

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Some embodiments described herein provide techniques for generating a meta-model semantic network that is usable, in some embodiments, to conduct data searches for enterprise data. For example, a business application may store an instance of a business object related to a particular employee. Such a business object may be associated with a definition. In some embodiments, a meta-model associated with the definition is created to provide semantic information regarding the particular business object. Embodiments may then extract the business object from the business application to generate semantic objects and semantic relations that are stored in the meta-model semantic network. After the meta-model semantic network contains the semantic objects and semantic relations associated with the business object, the meta-model semantic network may then be used to search the business object in a meaningful manner.

Prior to discussing specific example embodiments, further descriptions of some terms are now provided for a better understanding of the descriptions set forth herein.

"Enterprise data," as used herein, may refer to data maintained by an enterprise, such as a business, individual, group, or any other organization. Examples of enterprise data include, for example, business objects, business documents, notes, bookmarks, annotations, terminology, or any other business concept. In some embodiments, the enterprise data may be extracted from heterogeneous sources (e.g., an email database server and a purchase order database). Further, the enterprise data may be structured (e.g., type defined via a schema, such extensible markup language (XML)) or unstructured (e.g., word documents).

As used herein, a "semantic network" may refer to a network of semantic objects connected through semantic relations. A "semantic object," as used herein, may refer to a conceptual representation of a notion recognized by an enterprise, such as a product, person, employee, customer, business, document, case, project, business object, term, or any other suitable data. A "semantic relation," as used herein, may refer to a relationship between two or more semantic objects. Such relationships may have attributes and a type or definition that provides a conceptual meaning to how the two or more semantic objects are related to each other.

As used herein, a "meta-model semantic network" may refer to a semantic network generated based on a meta-model of the enterprise data. A "meta-model," as used herein, is a model that characterizes the conceptual meaning of elements of a business object definition. In turn, a "model" is a characterization of instances of an enterprise data. A definition of a business object is an example of a model. The definition may model an instance by defining the attributes (e.g., an address) associated with the business object. The meta-model then models these attributes and gives meaning to attributes (e.g., an address is a location).

"Semantic information," as used herein, may refer to information that provide conceptual meaning to enterprise data. Such semantic information may associate particular enterprise data with concepts maintained by an enterprise. For example, a collection of attributes (e.g., street, city, state, zip code, and the like) may be given a meaning of understanding (e.g., location). Such semantic information may be formally organized as "semantic object definitions" and "semantic relation definitions."

A "rule definition," as used herein, is a set of rules that maps enterprise data to definitions of semantic objects and semantic relations. In an example embodiment, a rule definition may include tokens and expressions with types and meta-data information that maps enterprise data (e.g., an instance of a business object) to semantic information contained in a meta-model.

FIG. 1 is a block diagram depicting an architectural overview of a system 100 for generating a meta-model semantic network that is usable for conducting data searches, in accordance with an example embodiment. The networked system 100 includes a meta-model semantic network manager 110 that is in communication with a text analyzer 112 and a semantic modeler 114. The meta-model semantic network manager 110, the text analyzer 112, and the semantic modeling tool 114 may be embodied, individually or in combination, in a computing device in the form of, for example, a personal computer, a server computer, or any other suitable computing device. In various embodiments, the computing device may be used to implement computer programs, logic, applications, methods, processes, or software to conduct a search using context information, as described in more detail below.

The meta-model semantic network manager 110 is designed to maintain the meta-model semantic network 116. As described above, the meta-model semantic network 116 may be a semantic network that includes semantic objects and semantic relations that provide meaning to particular enterprise data, such as, for example, business objects, business documents, notes, bookmarks, annotations, terminology, or any other business concept or enterprise data used within the enterprise. For example, John Smith, as a concept within the enterprise, may be associated with various business objects (e.g., a sales order, employee record, customer record, or any other suitable business object) and with documents created or otherwise involving John Smith.

As described above, the semantic objects and relations stored in the meta-model semantic network 116 may be based, in part, on semantic object definitions 115 and semantic relation definitions 117. Such semantic definitions may be based on a meta-model of the enterprise data. For example, the semantic network modeler 114 is a modeling tool that uses a meta-modeling based approach to generate a semantic object definition 115 and a semantic relation definition 117. The semantic object definition 115 and the semantic relation definition 117 may extend the definitions of enterprise data (e.g., business objects) at the meta-model level to provide semantic information. Such semantic information provides supplemental meaning to the elements, attributes, and relations between the business objects. As an example, the definition of an employee business object may be associated with an address. In some embodiments, such an address may be a field of the business object, and, in other embodiments, such an address may be represented by a separate business object. In this example, the semantic network modeler 114 may extend the definition of the employee definition, at the meta-model level, to give the address field the semantic meaning of location. That is, the association between the employee and the address characterizes the location of the particular employee.

In some embodiments, to assist an enterprise user in creating the semantic object definition 115 and the semantic relation definition 117, the semantic network modeler 114 may extract existing enterprise definitions stored in a business object repository 134. For example, a source of business objects definitions in an SAP environment may be the SAP Enterprise Service Repository (ESR) or the SAP By-Design Model Repository. Once the business object definitions are extracted from the business object repository 134, the semantic network modeler 114 may be configured to provide, for example, a user interface to an enterprise user so that the enterprise user can model such definitions in a way that gives semantic meaning to the business objects.

The semantic network modeler 114 may be configured to send the semantic object definition 115 and the semantic relation definition 117 to the meta-model semantic network manager 110. In turn, the meta-model semantic network manager 110 may generate rule definitions 135, which are then sent to the text analyzer 112. The rule definition 135 may contain the tokens and expressions with its types and meta-data. For example, the rule definition 135 may include data derived from the semantic modeler 114. The text analyzer 112 uses the rule definition 135 to determine the terms used in the documents 130 and the business objects 128 upon receiving data from the crawler 132. Analyzed data, in the form of objects and relations 136, are then sent to the meta-model semantic network manager 110 to be imported in the meta-model semantic network 116.

As described above, the meta-model semantic network 116 may store relations with enterprise data. In some embodiments, as shown in FIG. 1, the meta-model semantic network manager 110 may receive the enterprise data through the text analyzer 112. The text analyzer 112 is configured to extract enterprise data from enterprise data sources and export objects and relations 136 to the meta-model semantic network manager 110. The text analyzer 112 may extract enterprise data stored by enterprise systems, such as a business object 128 stored by a business application 125 and/or a document 130 stored by a document storage system 124. The business application 125 and the document storage system 124 are examples of enterprise data sources 126. As is explained below, data derived from the business object 128 and the document 130 may be obtained through a crawler 132. Based on the rule definition 135, the text analyzer 112 communicates objects and relations 136 to the meta-model semantic network manager 110.

The crawler 132, with access to the enterprise data sources 126, can provide enterprise data to the text analyzer 112. The crawler 132 may be a software program that, when executed by a computer, obtains the enterprise data stored by the enterprise data sources 126. To obtain the enterprise data, according to some embodiments, the crawler 132 is configured to parse, categorize, and analyze data. Enterprise data derived from the document 130 and business object 128 are examples of enterprise data that may be provided to the text analyzer 112. In particular, the crawler 132 may derive data from instances of specific business objects, which may be formatted in a structured format such as XML, or may derive data in the form of keywords used in the documentation maintained by the enterprise.

Figure 2:
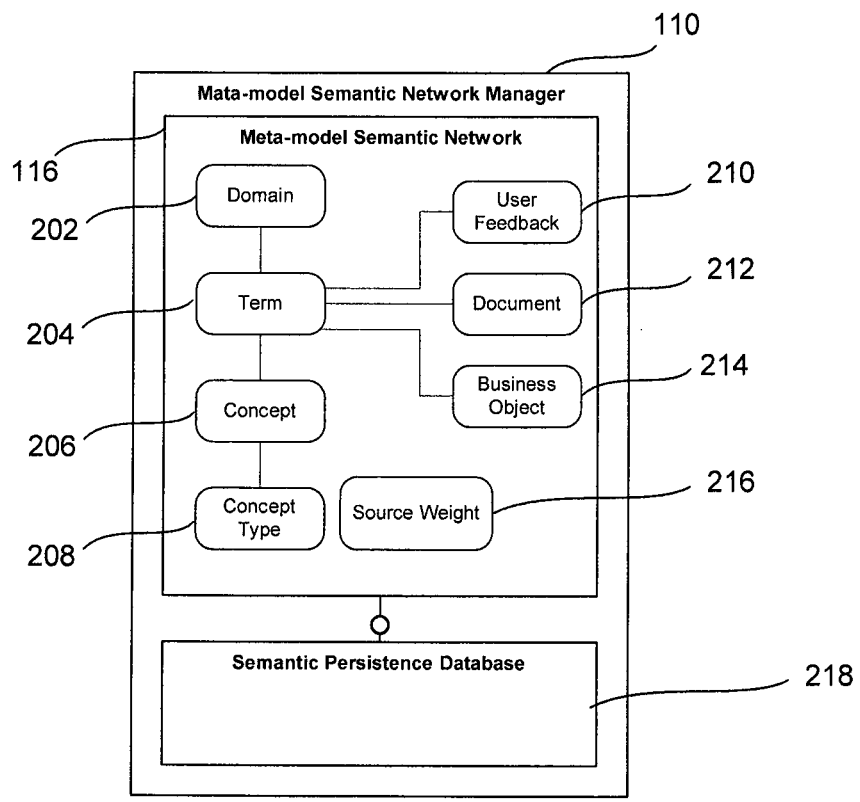
FIG. 2 is a block diagram showing a simplified meta-model semantic network, in accordance with an embodiment, for conducting searches using semantic objects.

FIG. 2 depicts a block diagram showing a simplified meta-model semantic network 116, in accordance with an embodiment, for conducting searches using semantic objects.

As FIG. 2 shows, the meta-model semantic network 116 includes nodes that link a term 204 to a domain 202 and a concept 206. In turn, the concept 206 may be linked to a concept type 208. Although FIG. 2 shows the nodes of the semantic network 116 as single entities, it is to be appreciated that meta-model semantic network 116 may include fewer or more nodes apart from those shown in FIG. 2. For example, a concept may be linked to one or more terms. Still further, additional and different nodes may be utilized by the meta-model semantic network 116.

The term 204 may be a word or phrase found in a business application, a document, the Internet or Web, or manually created by an end-user. The concept 206 may refer to a unit of meaning to which the term 204 refers to, such as a specific idea or notion. The concept 206 groups all the terms that are used to express this idea as synonyms. For example, a product may be associated with multiple product names. Accordingly, each of the product names may be stored as separate terms in the meta-model semantic network 116, all linked to the same product concept.

The domain 202 may associate the term 204 with a particular knowledge domain used within an enterprise. A collection of terms associated with a particular domain may then define the vocabulary used to describe concepts in a knowledge domain.

The concept type 208 may be metadata that characterizes the attributes associated with the concept 206. The concept type 208 may, for example, describe the attributes associated with the concept 206 for a particular product.

The meta-model semantic network 116 may also include nodes that relate the term 204 to enterprise data, such as a user feedback object 210, document 212, and business object 214. A user feedback object 210 may be any data embedded into enterprise data to provide further contextual data to the enterprise data. Notes, bookmarks, annotations, or any other user embedded data are examples of user feedback objects.

In some embodiments, the semantic relations between the term 204 and the nodes 210, 212, 214 may be influenced by a source weight 216. The source weight 216 may be a weighting factor that makes some relationships more relevant. In some embodiments, the source weight 216 may indicate that a node is more or less relevant based on the user feedback object 210. In other cases, a document 212 that merely mentions some of the attributes of a concept 206 may receive a lesser weight than a business object that includes much the relevant relations and attributes.

The semantic persistence database 218 may store different meta-model semantic networks 116. For example, a first meta-model semantic network may include semantic relations and semantic objects optimized to respond to queries directed to sales orders (e.g., who created a sales order, what suppliers provide a certain part, etc), while another meta-model semantic network may include semantic relations and semantic objects optimized to respond to queries related to finding experts in a domain.

With reference back to FIG. 1, it should be appreciated that in other embodiments, the system 100 may include fewer or more components apart from those shown in FIG. 1. For example, in an alternate embodiment, the text analyzer 112 can be integrated within the meta-model semantic network manager 110. The components and respective modules shown in FIG. 1 may be in the form of software that is processed by a processor. In another example, as explained in more detail below, the components and respective modules shown in FIG. 1 may be in the form of firmware that is processed by application specific integrated circuits (ASIC), which may be integrated into a circuit board. Alternatively, the components and respective modules shown in FIG. 1 may be in the form of one or more logic blocks included in a programmable logic device (for example, a field programmable gate array). The components and respective modules shown in FIG. 1 may be adapted, and/or additional structures may be provided, to provide alternative or additional functionalities beyond those specifically discussed in reference to FIG. 1. Examples of such alternative or additional functionalities will be discussed in reference to the flow diagrams discussed below.

Figure 3:
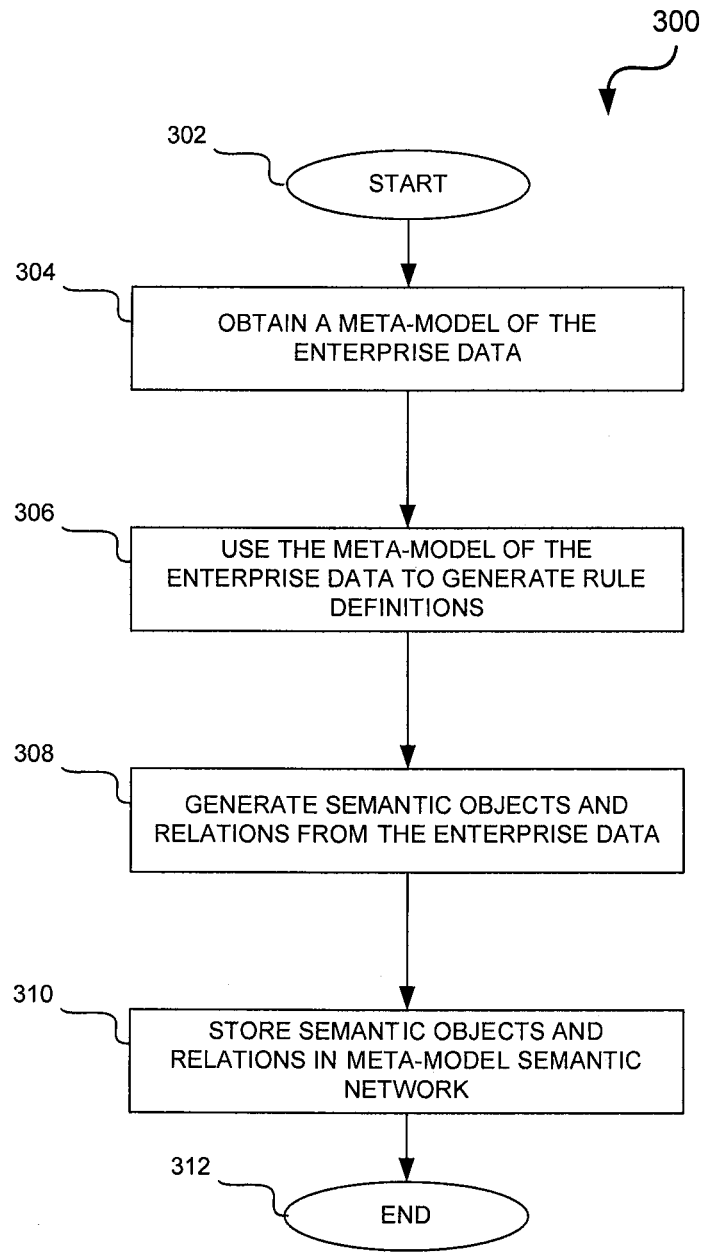
FIG. 3 depicts a flow diagram of a general overview of a method for conducting a data search using a meta-model semantic network, in accordance with an embodiment.

FIG. 3 depicts a flow diagram of a general overview of a method 300, in accordance with an embodiment, for conducting a data search using a meta-model semantic network. In an example embodiment, the method 300 may be implemented by the meta-model semantic network manager 110 included in the system 100 of FIG. 1.

Referring to FIG. 3, the method may begin at operation 302. Then, at operation 304, the meta-model semantic network manager 110 may obtain a meta-model of the enterprise data. As explained above, such meta-models may be received from a meta-modeling tool. For example, an enterprise user may use the semantic modeler 114 to access enterprise data definitions. As explained above, enterprise data definitions may include data definitions such as business object definitions, class or structure definitions, or any other suitable data definition. In some embodiments, the semantic modeling tool may then automatically infer meta-modeling information from the definitions. In other embodiments, an enterprise user may access the enterprise data definitions to generate the meta-models. For example, the enterprise user may select the fields of a structure that are most important to the meta-model of the enterprise data. This selection of fields optimizes the processing of the meta-model semantic manager 110 because, for example, an enterprise data definition may contain many fields. Allowing the enterprise user to select particular fields to model reduces the search space and limits the potential impact of a field with low probative value would have on classifying the enterprise data. The meta-models generated by the meta-modeling tool add semantic information to the definitions used in the enterprise. For example, the meta-models may provide conceptual meaning to the attributes of a business object.

At operation 306, the system 100 then uses the meta-model of the enterprise data, obtained at operation 304, to generate rule definitions. As described above, the meta-model semantic manager 110 and/or the text analyzer 112 may use the rule definition 135 to link enterprise data to terms stored in the meta-model semantic network 116. For example, as explained above, the meta-model of an employee business object may characterize the meaning of an address attribute of an employee record in a way that gives the address attribute the semantic meaning of location. The semantic meaning of the address attribute and the employee record then may be represented by the semantic object definition 115 and semantic relation definition 117. In this way, the semantic object definition 115 and the semantic relation definition 117 may be used to generate a rule that maps enterprise data to the semantic object definition and the semantic relation definition.

After the rule definition 135 is generated, at operation 308, the system 100 may generate, using the rule definition 135, semantic objects and semantic relations 136 from data extracted from the enterprise data sources 126. For example, with reference to FIG. 4, a diagram illustrating a simplified example of a three level MOF structure 400 is shown.

At the M0 level, an instance 402 of a business object may be stored in, for example, the enterprise data source 126 (e.g., in the business application 125). The instance 402 may include a name attribute 410 that stores the string "John Doe." Further, the instance 402 may include an address attribute 412 that is a complex attribute type that stores sub-attributes that specify an address, such as a street, city, state, and zip code. It is to be appreciated that in some embodiments, the instance 402 does not include meta-data that indicates that name attribute 410 relates to a name. Nor, in other embodiments, does the instance include meta-data that indicates that the address attribute 412 relates to an address. Instead, the attributes 410, 412 merely include respective values. It is to be further appreciated that the types used herein to describe attributes 410, 412 are used merely for clarity of description. In other embodiments, the attributes 410, 412 may be represented as any suitable data type, such as a class, structure, reference, array, or pointer.

Figure 4:
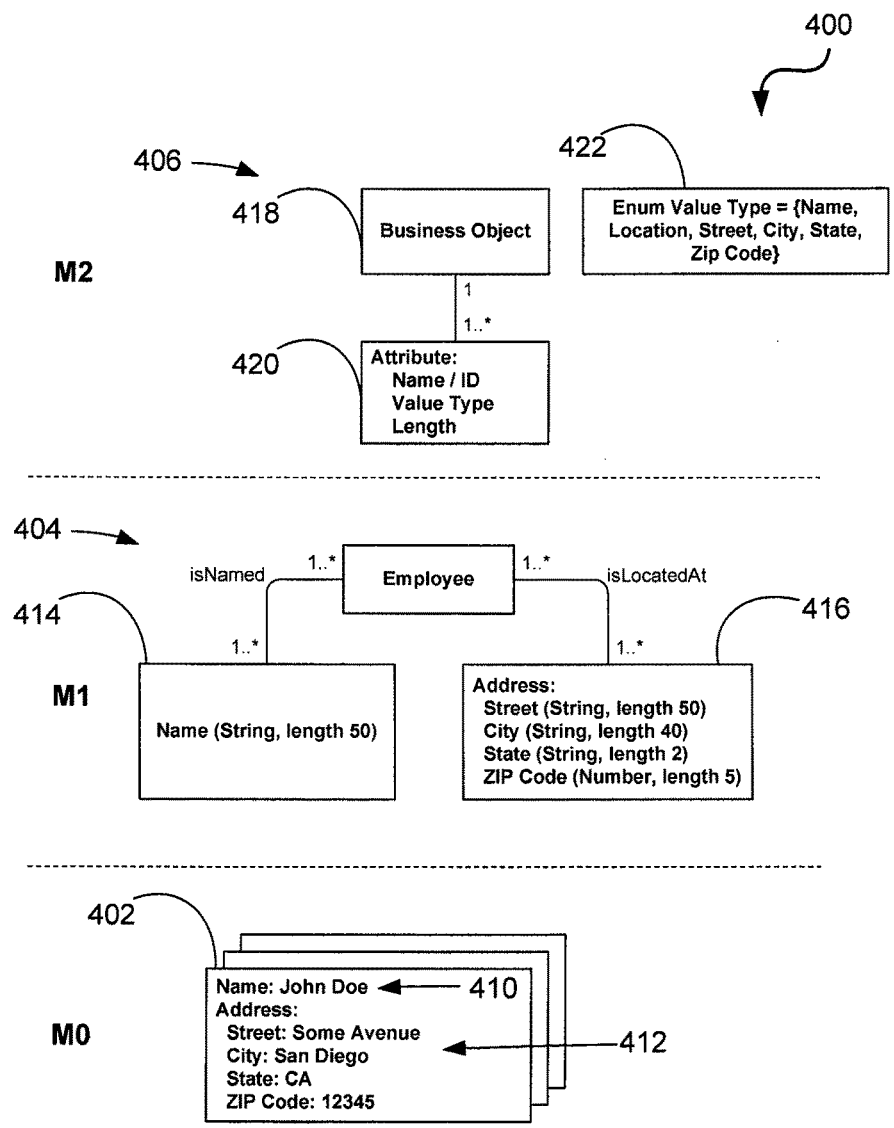
FIG. 4 is a diagram illustrating a simple example of a three level meta-object facility (MOF) structure, in accordance with an example embodiment.

At the M1 level, an example of a model 404 of the business object is illustrated. As FIG. 4 shows, the model 404 shows, in formal representation, the structure of an instance of the Employee business object. As used herein, a model is formal where the model provides type definitions that are usable to a computer system. For example, a data type (e.g., a string data type) may define how the data is stored and the operations that may be applied thereto. However, a string data type, by itself, does not provide semantic meaning. That is, the model 404 lacks a conceptual meaning of the Name definition or the address definition.

Still at the M1 level, the model 404 defines that employee objects have a name attribute 414 through a isNamed relationship. The name attribute 414 is defined to be a string data type, with length of 50. Further, the model 404 defines that employee objects have an address attribute 416 through a isLocatedAt relationship. The address attribute 416 is defined to be of a complex type with sub-attribute definitions, such as a street definition, city definition, state definition, zip code definition, each with a corresponding type definition and field length. As can be appreciated, the instance 402 is an instantiation of the model 404.

A meta-model is defined at the M2 level. The meta-model 406 defines the rules and constructs of how a model in the M1 level may be defined, such as model 404. For example, the meta-model 406 defines that a model of a business object 418 may include an association with an attribute 420. The attribute 420, in turn, is defined to include a name or identifier, value type, and length. As can be seen at the M1 level, without further definitions, the name attribute 414 is a valid instantiation of the attribute 420 because it contains the necessary elements defined in the attribute 420.

However, to provide semantic understanding to the model 404, the meta-model 406 may further define conceptual types 422. The conceptual types 422 may enumerate the concepts that may be used as value types in the attribute 420. The conceptual types 422 may correspond to the concepts in the meta-model semantic network 116. According to the attribute 420 and the conceptual types 422 of the meta-model 406, the name attribute 414 is invalid because the string type is not a concept enumerated in the conceptual types 422. Accordingly, an expert may use the semantic modeler 114 to replace formal types with conceptual types listed in the meta-model 406. For example, the "String" data type may be replaced with the "Name" concept.

Although not shown, it is to be appreciated by those skilled in the art that the meta-model may further include definitions of relationships that may be instantiated at the M1 level. For example, a business object may be associated with a relationship that includes, among other things, a name (e.g., is Named), direction (uni- or bi-directional), and relationship type (e.g., as may be enumerated by a relationship type).

In example embodiments, the meta-model 406 may form the basis of the semantic object definition 115 and semantic relation definition 117. For example, the semantic object definition 115 may map the name attribute 410 to a conceptual meaning corresponding to a Name (e.g., as may be set in the name attribute 414 through the conceptual value type 422). Other conceptual meanings may be set in the semantic object definition 115 according to the meta-model 406 and model 404, such as a Location concept corresponding to the address field 412.

Based on the example semantic object definition 115 and semantic relation definition 117, the text analyzer 112 may extract the instance 402 from the enterprise data source 126. According to the semantic object definition 115 and semantic relation generated from the meta-model 406, the text analyzer 112 may then create a semantic object that the instance 402 is an employee that is named John Doe and is further located at San Diego, Calif.

With reference back to FIG. 3, after semantic objects and relationships are extracted from the enterprise data, the semantic objects and relationships may be stored in the meta-model semantic network 116 maintained by the meta-model semantic network manager 110. This is shown as operation 310. For example, a term related to John Doe may be semantically related to a San Diego business object, for example, and a term associated with San Diego may be associated with the John Doe business object. The method 300 then ends at operation 312.

Once the meta-model semantic network 116 is constructed based on the enterprise data and the meta-model of the definitions of the semantic network, the system 100 may then answer many enterprise questions, such as who is working on a particular topic (e.g., using particular terminology), which documents are describing a sale of a particular material, which supplier offers a material that fulfils specified conditions, or any other suitable query.

Figure 5:
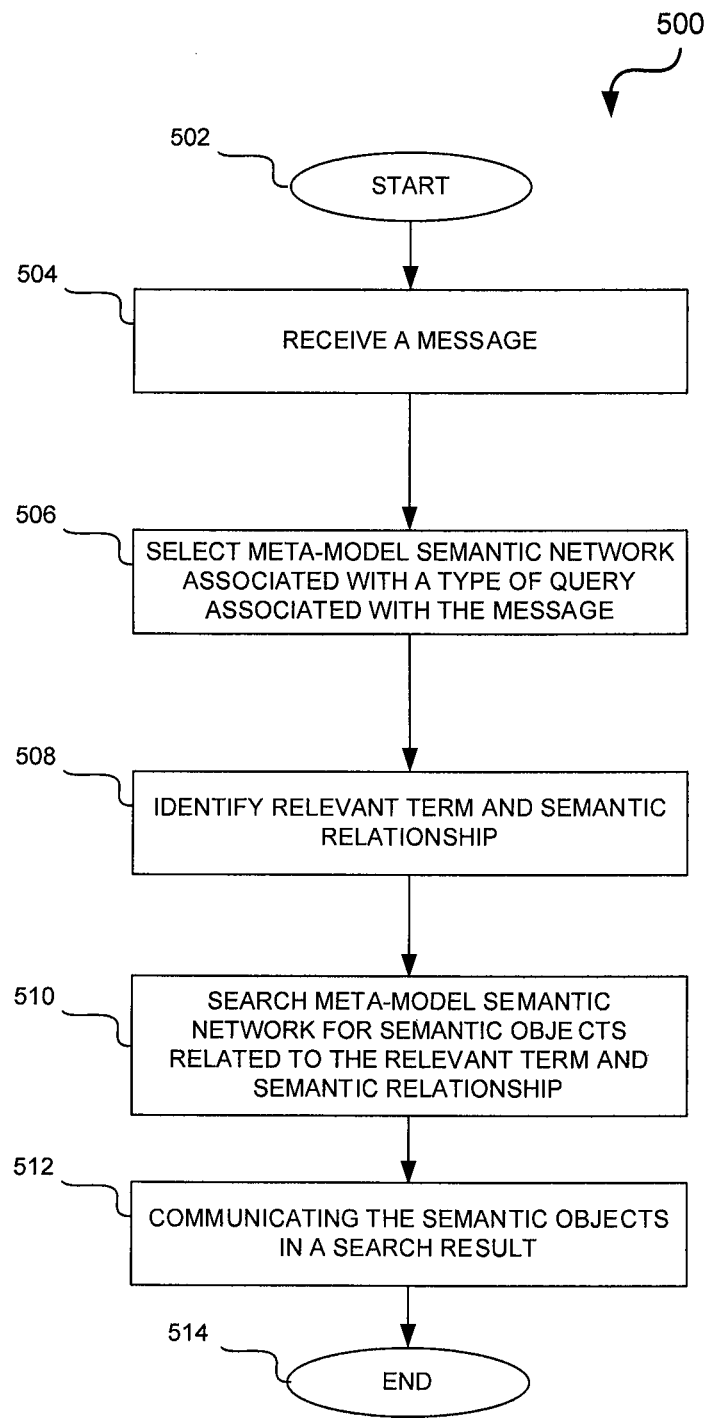
FIG. 5 depicts a flow diagram of a general overview of a method for conducting a data search using a meta-model semantic network, in accordance with an embodiment.

FIG. 5 depicts a flow diagram of a general overview of a method 500, in accordance with an embodiment, for conducting a data search using a meta-model semantic network. In an example embodiment, the method 500 may be implemented by the meta-model semantic network manager 110 included in the system 100 of FIG. 1.

The method 500 may begin at operation 502. Then the meta-model semantic network manager 110 receives a message from, for example, a client application at operation 504. This message includes one or more terms that, in one embodiment, may relate to requests for enterprise data. For example, the message may be in the form of a question typed by a user requesting information about a particular business application. In another example, the message may be a request by a user for a list of experts in a certain technical field, or all employee located in San Diego, for example.

In some embodiments, depending on the query received by the client application, the meta-model semantic network manager 110 may select from the semantic persistence database 218 a meta-model semantic network that is optimized for the particular query received. This is shown at operation 506.

At operation 508, the meta-model semantic network manager 110 may then identify the relevant terms and semantic relations associated with the message received at operation 504. For example, as a simplified example, the message received at operation 504 may request the meta-model semantic network manager 110 to find all employees located in San Diego. Accordingly, the meta-model model semantic network manager 110 may select "San Diego" as a relevant term to search on. Further, the meta-model semantic network manager 110 may determine that the search should be based on a semantic relation that signifies location, such as a locationOf semantic relation (see, e.g., FIG. 4). Still further, in this simple example, the meta-model semantic network manager 110 may determine that the term "San Diego" should be semantically related to Employee business objects. As such, the meta-model semantic network manager 110 may load a meta-model semantic network corresponding to Employee business objects.

The meta-model semantic network manager 110 may then search, at operation 510, the meta-model semantic network 116 for the term "San Diego" associated with the concept of the city in California. Once the term "San Diego" is found, the meta-model semantic network manager 110 may then find all the semantic objects connected to the term through a locationOf type semantic relation, or any other semantic relation that defines a relationship between two semantic objects that indicates location.

Once the relevant semantic objects are found by the meta-model semantic network manager 110, the search result is returned to the client application at operation 512. The method 500 ends at operation 514.

Figure 6:
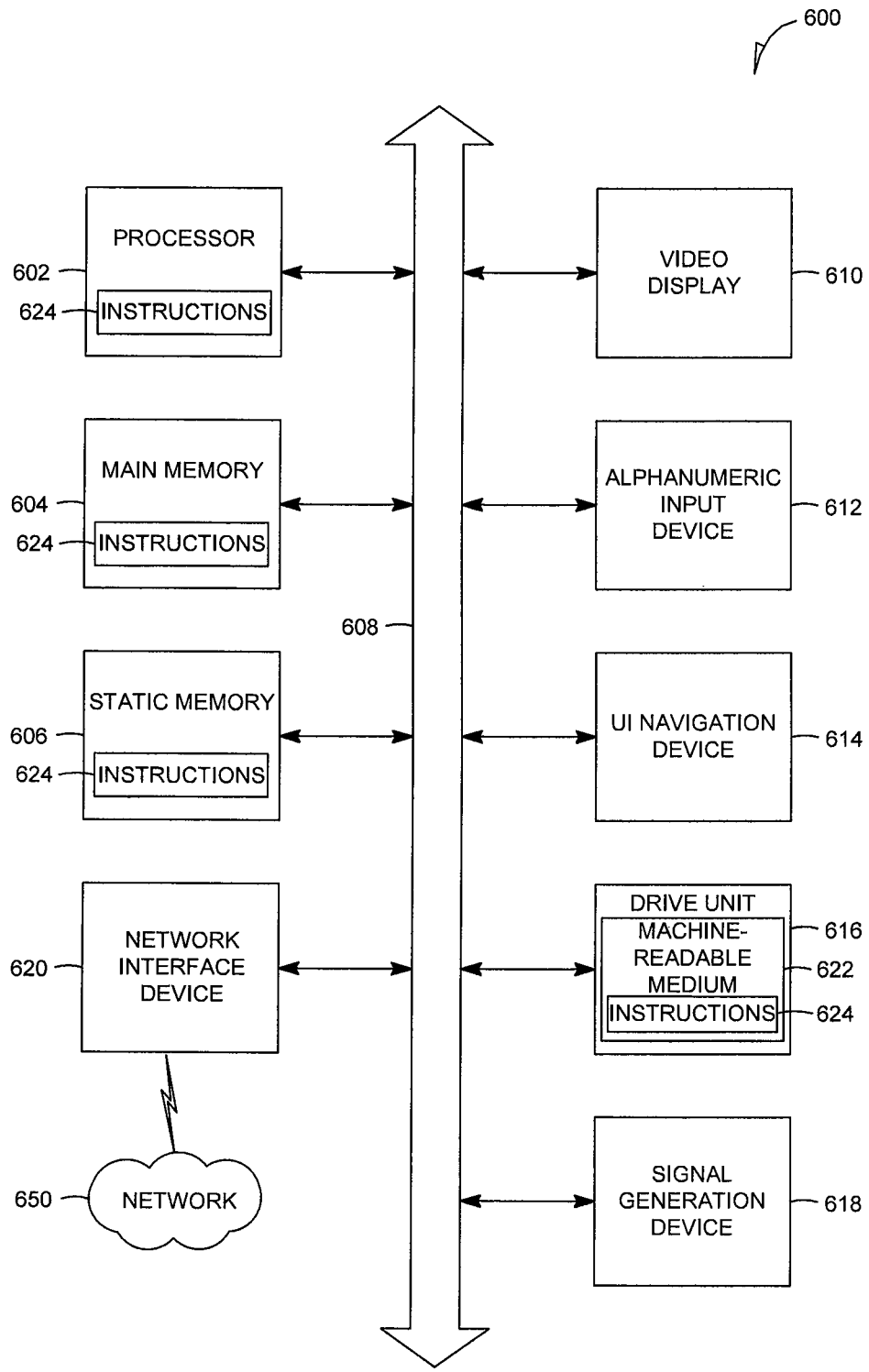
FIG. 6 a block diagram depicting a machine in the example form of a computing device within which may be executed a set of instructions for causing the machine to perform any one or more of the methodologies discussed herein.

FIG. 6 depicts a block diagram of a machine in the example form of a computing device 600 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 600 includes a processor 602 (e.g., a central processing unit (CPU), a graphics processing unit (GPU) or both), a main memory 604 (e.g., random access memory), and static memory 606 (e.g., static random-access memory), which communicate with each other via bus 608. The computing device 600 may further include video display unit 610 (e.g., a plasma display, a liquid crystal display (LCD) or a cathode ray tube (CRT)). The computing device 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604 and/or within the processor 602 during execution thereof by computing device 600, with the main memory 604 and processor 602 also constituting machine-readable, tangible media.

The data structures and instructions 624 may further be transmitted or received over a computer network 650 via network interface device 620 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 600) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment (s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method, utilizing at least one computing device, comprising:
retrieving data definitions defining types of a plurality of business objects stored in enterprise data, the data definitions specify one or more attributes for each of the types of the plurality of business objects;
generating, based at least in part on the data definitions, a meta-model of the enterprise data, the meta-model provides semantic information characterizing conceptual meaning to the one or more attributes;
using the meta-model of the enterprise data to generate a rule definition that maps the enterprise data to the semantic information;
using the rule definition to generate at least one semantic object and at least one semantic relation from the plurality of business objects stored in the enterprise data; and
storing the at least one semantic object and the at least one semantic relation in a meta-model semantic network, the meta-model semantic network associating a term to the at least one semantic object.

2. The method of claim 1, wherein the generating of the meta-model of the enterprise data includes retrieving pre-existing data definitions associated with the enterprise data.

3. The method of claim 1, wherein the meta-model semantic network is optimized for a specific type of query.

4. The method of claim 1, further comprising:
receiving a message with a search query;
identifying a relevant term in the search query;
identifying that the at least one semantic relation is associated with the search query;
searching the meta-model semantic network for semantic objects linked to the relevant term according to the at least one semantic relation; and
communicating the semantic objects in a search result.

5. The method of claim 4, further comprising obtaining the meta-model semantic network based on the search query, wherein the meta-model semantic network is optimized for the search query.

6. The method of claim 1, wherein the enterprise data further includes documents and user feedback objects.

7. The method of claim 1, wherein the at least one semantic relation is associated with a weighted value.

8. The method of claim 1, wherein the meta-model provides semantic information regarding the one or more attributes by defining conceptual types representing valid attribute types for the one or more attributes specified by the data definitions.

9. The method of claim 8, further comprising, in response to a user input, mapping one of the conceptual types to the one or more attributes specified by the data definitions.

10. A non-transitory, machine-readable medium that stores instructions, which, when performed by a machine, cause the machine to perform operations comprising:
retrieving data definitions defining types of a plurality of business objects stored in enterprise data, the data definitions specify one or more attributes for each of the types of the plurality of business objects;
generating, based at least in part on the data definitions, a meta-model of the enterprise data, the meta-model provides semantic information characterizing conceptual meaning to the one or more attributes;
using the meta-model of the enterprise data to generate a rule definition that maps the enterprise data to the semantic information;
using the rule definition to generate at least one semantic object and at least one semantic relation from the plurality of business objects stored in the enterprise data; and
storing the at least one semantic object and the at least one semantic relation in a meta-model semantic network, the meta-model semantic network associating a term to the at least one semantic object.

11. The non-transitory, machine-readable medium of claim 10, wherein the generating of the meta-model of the enterprise data includes retrieving existing data definitions associated with the enterprise data.

12. The non-transitory, machine-readable medium of claim 10, wherein the meta-model semantic network is optimized for a specific type of query.

13. The non-transitory, machine-readable medium of claim 10, further comprising:
receiving a message with a search query;
identifying a relevant term in the search query;
identifying that the at least one semantic relation is associated with the search query;
searching the meta-model semantic network for semantic objects linked to the relevant term according to the at least one semantic relation; and
communicating the semantic objects in a search result.

14. The non-transitory, machine-readable medium of claim 13, further comprising obtaining the meta-model semantic network based on the search query, wherein the meta-model semantic network is optimized for the search query.

15. The non-transitory, machine-readable medium of claim 10, wherein the enterprise data further includes documents and user feedback objects.

16. The non-transitory, machine-readable medium of claim 10, wherein the at least one semantic relation is associated with a weighted value.

17. An apparatus comprising:
at least one processor implemented at least partially by hardware; and
a meta-model semantic network manager configured by the at least one processor to:
retrieve data definitions defining types of a plurality of business objects stored in enterprise data, the data definitions specify one or more attributes for each of the types of the plurality of business objects;
generate, based at least in part on the data definitions, a meta-model of the enterprise data, the meta-model provides semantic information characterizing conceptual meaning to the one or more attributes;
use the meta-model of the enterprise data to generate a rule definition that maps the enterprise data to the semantic information;
use the rule definition to generate at least one semantic object and at least one semantic relation from the plurality of business objects stored in the enterprise data; and
store the at least one semantic object and the at least one semantic relation in a meta-model semantic network, the meta-model semantic network associating a term to the at least one semantic object.

18. The apparatus of claim 17, wherein the generating of the meta-model of the enterprise data includes retrieving existing data definitions associated with the enterprise data.

19. The apparatus of claim 17, wherein the meta-model semantic network is optimized for a specific type of query.

20. The apparatus of claim 17, wherein the meta-model semantic network manager is further configured to:
receive a message with a search query;
identify a relevant term in the search query;
identify that the at least one semantic relation is associated with the search query;
search the meta-model semantic network for semantic objects linked to the relevant term according to the at least one semantic relation; and
communicate the semantic objects in a search result.

21. The apparatus of claim 17, wherein the enterprise data further includes documents and user feedback objects.

22. The apparatus of claim 17, wherein the at least one semantic relation is associated with a weighted value.

* * * * *